United States Patent
Chaplin, III et al.

(10) Patent No.: US 9,897,209 B2
(45) Date of Patent: Feb. 20, 2018

(54) SEAL ASSEMBLY AND/OR COMPONENT THEREOF AND METHOD OF MANUFACTURING AND/OR USING SAME

(71) Applicant: AKTIEBOLAGET SKF, Gothenburg (SE)

(72) Inventors: Raymond Lee Chaplin, III, Draper, UT (US); Tyler James Ryther, SLV, UT (US)

(73) Assignee: AKTIEBOLAGET SKF, Gothenburg (SE)

( * ) Notice: Subject to any disclaimer, the term of this patent is extended or adjusted under 35 U.S.C. 154(b) by 405 days.

(21) Appl. No.: 14/669,608

(22) Filed: Mar. 26, 2015

(65) Prior Publication Data
US 2016/0281853 A1 Sep. 29, 2016

(51) Int. Cl.
*F16J 15/32* (2016.01)
*F16J 15/18* (2006.01)
*F16J 15/3228* (2016.01)
*F16J 15/3256* (2016.01)

(52) U.S. Cl.
CPC ........... *F16J 15/187* (2013.01); *F16J 15/181* (2013.01); *F16J 15/3228* (2013.01); *F16J 15/3256* (2013.01)

(58) Field of Classification Search
CPC ...... F16J 15/16; F16J 15/3252; F16J 15/3268; F16J 15/3276; F16J 15/3256
See application file for complete search history.

(56) References Cited

U.S. PATENT DOCUMENTS

| | | | | |
|---|---|---|---|---|
| 2,877,029 A | * | 3/1959 | Peguet ................. | F16J 15/3456 277/366 |
| 3,368,819 A | * | 2/1968 | Otto ..................... | F16J 15/3456 277/366 |
| 3,685,841 A | * | 8/1972 | Keller ................... | A63C 5/033 227/37 |
| 3,838,862 A | * | 10/1974 | Fern ..................... | F16J 15/3456 277/400 |
| 4,327,922 A | * | 5/1982 | Walther ............... | F16J 15/3256 277/351 |
| 4,345,770 A | * | 8/1982 | Seeh .................... | F16J 15/3264 277/364 |
| 4,484,752 A | * | 11/1984 | Bentley ................ | F16J 15/164 277/377 |
| 4,522,410 A | * | 6/1985 | Holzer ................. | F16J 15/3456 277/368 |
| 4,525,082 A | * | 6/1985 | Brandenstein ...... | F16C 33/7883 277/353 |
| 4,596,394 A | * | 6/1986 | Schmitt ............... | F16J 15/3256 277/353 |
| 4,632,404 A | * | 12/1986 | Feldle ................. | F16C 33/7859 277/348 |
| 4,817,966 A | * | 4/1989 | Borowski ............. | F16J 15/164 277/366 |

(Continued)

Primary Examiner — Vishal A Patel
(74) Attorney, Agent, or Firm — Mark Ussai; SKF USA Inc. Patent Dept.

(57) ABSTRACT

A sleeve, rotary seal, rotary seal assembly, shaft with an integrated primary surface, rotary seal assembly component, and/or any combination thereof which preferably results in rotary seals having a higher tolerance for radial eccentricity (static eccentricity and/or dynamic eccentricity). Related methods of manufacturing, using, and/or providing same are also set forth.

7 Claims, 3 Drawing Sheets

(56) References Cited

U.S. PATENT DOCUMENTS

| | | | | |
|---|---|---|---|---|
| 4,846,592 A * | 7/1989 | Tsumori | ................ | F16C 33/667 |
| | | | | 277/402 |
| 4,852,890 A * | 8/1989 | Borowski | ............... | F16J 15/164 |
| | | | | 277/366 |
| 4,854,749 A * | 8/1989 | Kohigashi | ........... | F16C 33/7853 |
| | | | | 277/369 |
| 5,484,213 A * | 1/1996 | Caillaut | ................ | B60C 23/003 |
| | | | | 152/417 |
| 5,492,337 A * | 2/1996 | Lederman | ............ | F16J 15/3264 |
| | | | | 277/307 |
| 5,975,534 A * | 11/1999 | Tajima | ................. | F16J 15/3264 |
| | | | | 277/353 |
| 6,149,158 A * | 11/2000 | Tripathy | .............. | F16J 15/3264 |
| | | | | 277/307 |
| 6,676,130 B2 * | 1/2004 | Schmitt | .................. | F16J 15/164 |
| | | | | 277/349 |
| 7,455,459 B2 * | 11/2008 | Toth | ........................ | F16C 33/76 |
| | | | | 324/174 |
| 7,637,665 B2 * | 12/2009 | Cook | ....................... | F16C 19/52 |
| | | | | 277/351 |
| 7,926,816 B2 * | 4/2011 | Shibayama | ......... | F16C 33/7883 |
| | | | | 277/551 |
| 8,011,670 B2 * | 9/2011 | Shibayama | ......... | B60B 27/0005 |
| | | | | 277/551 |
| 8,333,515 B2 * | 12/2012 | Milliken | ............. | F16C 33/7806 |
| | | | | 384/477 |
| 9,249,884 B2 * | 2/2016 | Jonsson | ................. | F16J 15/164 |
| 2015/0001810 A1 * | 1/2015 | Broadbent | ........... | F16J 15/3256 |
| | | | | 277/402 |

* cited by examiner

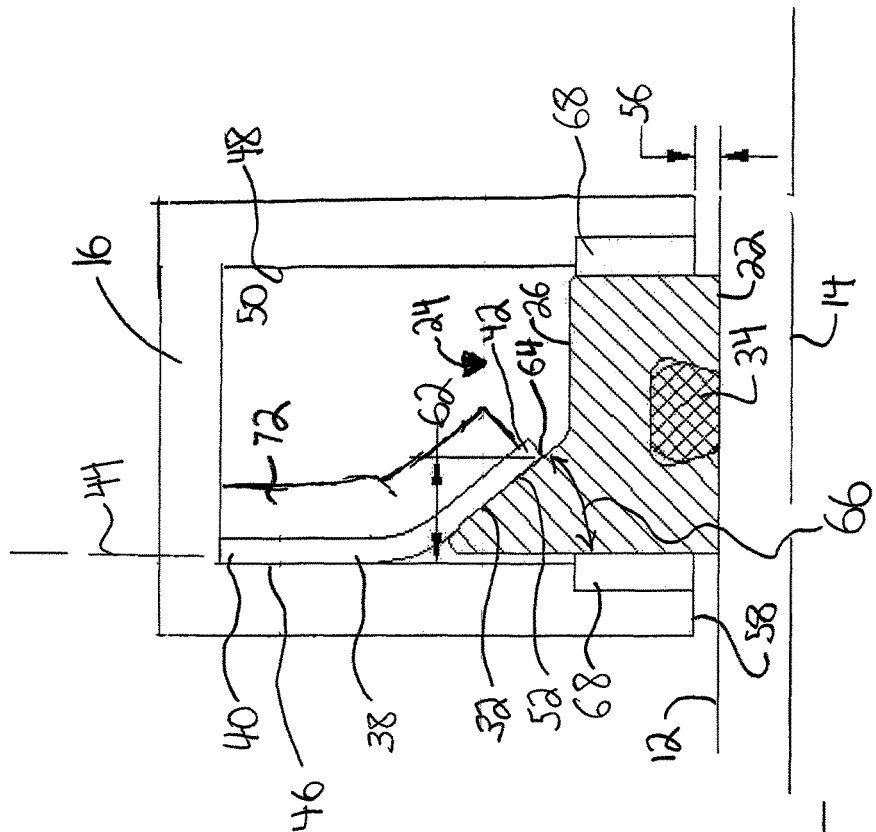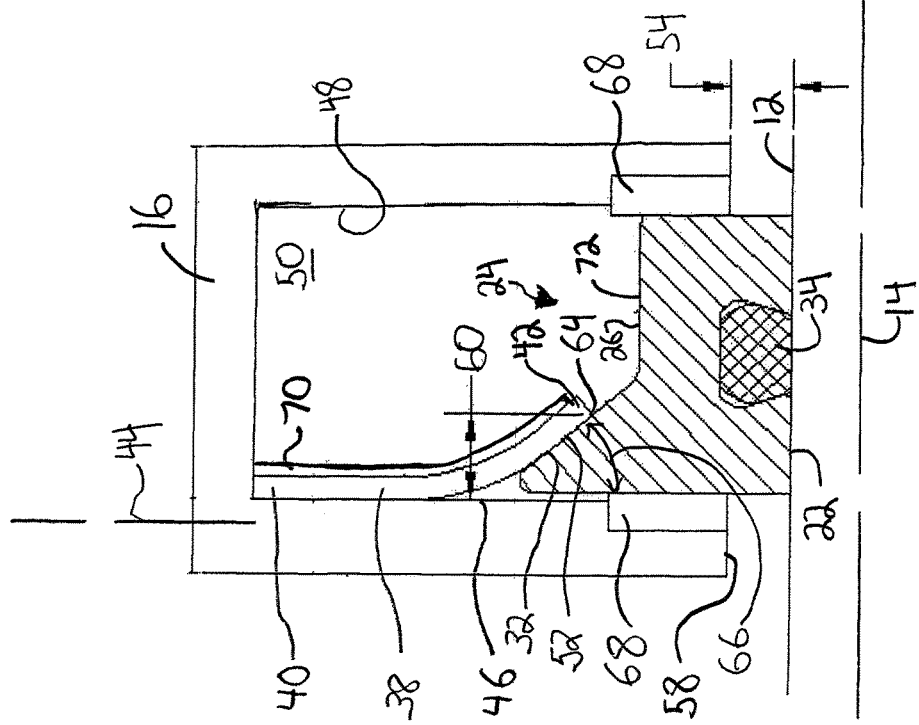

SEAL ASSEMBLY AND/OR COMPONENT THEREOF AND METHOD OF MANUFACTURING AND/OR USING SAME

BACKGROUND

The present invention is generally directed to rotary seal assemblies and, more specifically, to rotary seals assemblies and/or components thereof which are adapted for accommodating eccentric motion and/or adapted for longer service life.

Conventional rotary seals tend to fail under radial eccentricity after relatively short service lives. Failure can be a result of wear on the seal due to static or dynamic radial eccentricity and/or may be due to failure of the seal to properly track the surface against which it is intended to form a seal due to radial eccentricity. It may be advantageous to provide a seal, sleeve, gland, and/or sleeve assembly or component thereof which may: have improved tracking while experiencing radial eccentricity; undergo less wear during radial eccentricity; that is suitable for use as part of new equipment or can be retrofit into existing equipment; and/or that provides a longer service life.

SUMMARY

Briefly speaking, one embodiment of the present invention is directed to a seal assembly configured to dynamically seal a rotary shaft having a central shaft axis. The seal assembly may include a sleeve configured for positioning over the rotary shaft. The sleeve may have a radially inner surface configured to contact the rotary shaft and a radially outer surface. The radially outer surface can include a primary surface oriented at an angle relative to the central shaft axis when the sleeve is positioned over the rotary shaft. A seal may have a first seal end and a second seal end. The first seal end can be configured for securing to a gland disposed about the rotary shaft such that, when viewed in axial cross section, the seal approaches an orientation perpendicular to the central shaft axis proximate to the first seal end. The second seal end can be configured to create a dynamic seal with the primary surface of the sleeve wherein the angle of the primary surface reduces an amount of deflection of the seal resulting from radial eccentricity of the rotary shaft.

In another aspect, the present invention is directed to a method of providing a dynamic seal around a rotary shaft. The method includes the steps of: providing a seal having a first seal end and a second seal end; providing the rotary shaft having a central shaft axis, the rotary shaft having an outer surface comprising a primary surface which is at an angle relative to the central shaft axis; and securing the first seal end to a location proximate the rotary shaft such that the second seal end forms the dynamic seal with the primary surface, wherein the angle of the primary surface reduces an amount of deflection of the seal resulting from radial eccentricity of the rotary shaft.

In another aspect, the present invention is directed to a seal assembly configured to seal a rotary shaft having a central shaft axis. The seal assembly may include a sleeve configured for positioning over the rotary shaft. The sleeve can include a primary surface oriented at an angle relative to the central shaft axis when the sleeve is positioned over the rotary shaft. A seal end can be configured to create a dynamic seal with the primary surface of the sleeve wherein the angle of the primary surface reduces an amount of deflection of the seal resulting from radial eccentricity of the rotary shaft.

In another aspect, the present invention is directed to a sleeve configured for placement over a rotary shaft having a central shaft axis to facilitate the formation of a dynamic seal around the rotary shaft. The sleeve includes a sleeve body configured for positioning over the rotary shaft. A radially inner surface of the sleeve body is configured to contact the rotary shaft. A radially outer surface of the sleeve body includes a primary surface oriented at an angle relative to the central shaft axis when the sleeve is positioned over the rotary shaft. The primary surface being configured to abut a seal to create a dynamic seal. Wherein the angle of the primary surface is configured to reduce an amount of deflection of the seal resulting from radial eccentricity of the rotary shaft.

In another aspect, the present invention is directed to a sleeve configured for placement over a rotary shaft having a central shaft axis to facilitate the formation of a dynamic seal around the rotary shaft. The sleeve includes a sleeve body configured for positioning over the rotary shaft. A radially inner surface of the sleeve body is configured to contact the rotary shaft. The sleeve may have an increased frictional interface with the rotary shaft to encourage the sleeve to rotate with the rotary shaft without angular misalignment therebetween. A radially outer surface of the sleeve body includes a primary surface oriented at an angle relative to the central shaft axis when the sleeve is positioned over the rotary shaft. The primary surface being configured to abut a seal to create a dynamic seal. Wherein the angle of the primary surface is configured to reduce an amount of deflection of the seal resulting from radial eccentricity of the rotary shaft.

In another aspect, the present invention is directed to a sleeve configured for placement over a rotary shaft having a central shaft axis to facilitate the formation of a dynamic seal around the rotary shaft. The sleeve includes a sleeve body configured for positioning over the rotary shaft. A radially inner surface of the sleeve body is configured to contact the rotary shaft. The sleeve may have an increased frictional interface with the rotary shaft such that the sleeve rotates with the rotary shaft without angular misalignment therebetween and with no permanent fixing mechanism securing the sleeve to the rotary shaft. A radially outer surface of the sleeve body includes a primary surface oriented at an angle relative to the central shaft axis when the sleeve is positioned over the rotary shaft. The primary surface being configured to abut a seal to create a dynamic seal. Wherein the angle of the primary surface is configured to reduce an amount of deflection of the seal resulting from radial eccentricity of the rotary shaft.

In another aspect, the present invention is directed to a rotary shaft for use with a rotary seal wherein a portion of the rotary shaft has a variable diameter such that a primary surface which is angled with respect to a central shaft axis is integrated with the shaft. The primary surface being configured to abut a seal to create a dynamic seal. Wherein the angle of the primary surface is configured to reduce an amount of deflection of the seal resulting from radial eccentricity of the rotary shaft.

BRIEF DESCRIPTION OF THE DRAWINGS

The foregoing summary, as well as the following detailed description of the preferred embodiment of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 4 is a view similar to that of FIG. 2 of a seal assembly according to a second preferred embodiment of the present invention; A spring 70 is positioned over the seal 38 to preferably increase the force between the seal 38 and the primary surface 32 at the dynamic seal 52; and FIG. 5 is a view similar to that of FIG. 3 of a seal assembly according to a third preferred embodiment of the present invention; An energizer 72 is positioned over the seal 38 to preferably increase the force between the seal 38 and the primary surface 32 at the dynamic seal 52.

DETAILED DESCRIPTION OF THE PREFERRED EMBODIMENTS

Figure 1:
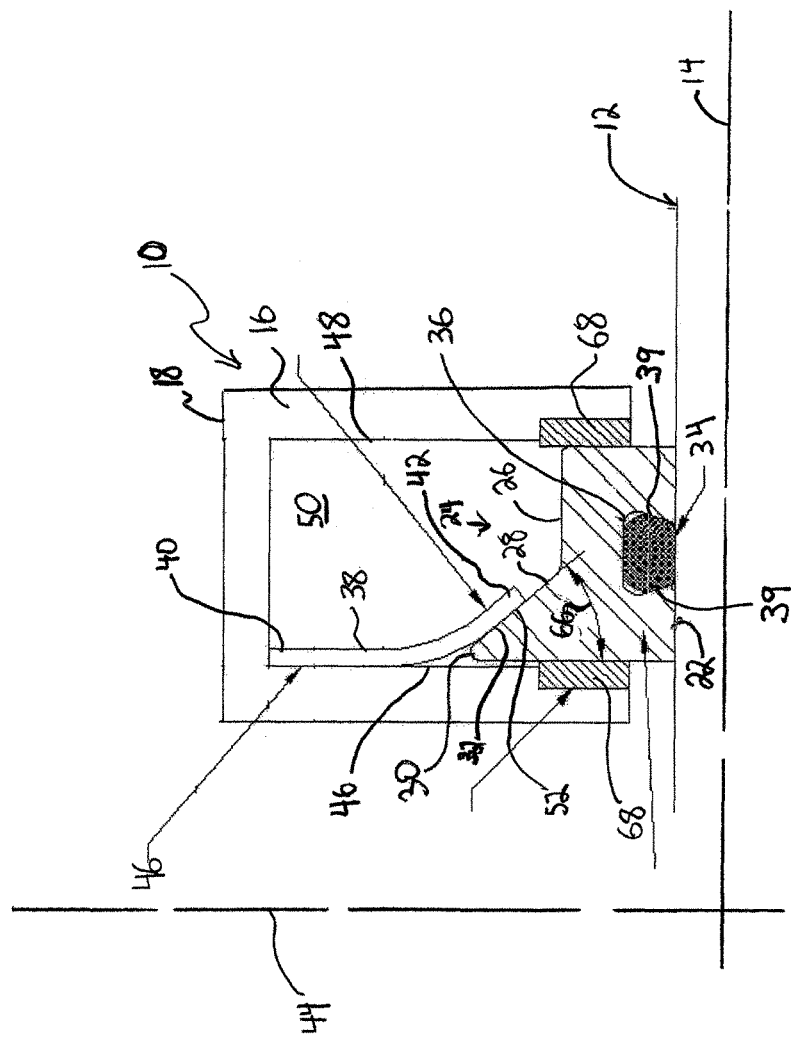
FIG. 1 is a partial axial cross-sectional view of a seal assembly according to preferred embodiment of the present invention; the seal assembly 10 preferably includes a sleeve 20 positioned over a rotary shaft 12; the sleeve 20 has a radially inner surface 22 configured to contact the rotary shaft 12 and a radially outer surface 24; the radially outer surface 24 includes a primary surface 32 oriented at an angle relative to a central shaft axis 14 when the sleeve 20 is positioned thereover; a seal 38 has a first seal end 40 that approaches an orientation perpendicular to the central shaft axis 14 proximate to the first seal end 40; a second seal end 42 is configured to create a dynamic seal 52 with the primary surface 32 of the sleeve.

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the seal and designated parts thereof. The term "dynamic surface", as used in the specification and/or in the corresponding portions of the specification, means "any surface which is in motion relative to another". For example, when the seal is secured in a static position against the housing except for one side that interfaces with a movable part, then the contacting surface of that movable part can be considered to be the dynamic surface. Some examples of a dynamic surface are the outer surface of a shaft, the outer surface of a rotary shaft, a rotating sleeve, sleeve, piston shaft, the outer surface of a plunger, the inner surface of a cylinder bore, or the like. The term "axial" is used in the claims and the corresponding portions of the specification in connection with the various surfaces of the seal and associated components. However, those of ordinary skill in the art will appreciate that the use of the term "axial" or "radial" does not imply a precisely linear and/or horizontal surface but instead is used to identify a surface in general, unless stated otherwise. For example, an axial surface may include a sawtooth profile, a channel, or the like therein. Similarly, the term "radial" as used in the claims and the corresponding portions of the specification in connection with various surfaces of the seal and associated components does not imply a precisely linear and/or vertical surface, but is also used to identify a surface in general. For example, as set forth below, the radially outer surface 24 of the sleeve 20 includes both a generally linear section 26 and a generally inclined section 28. Furthermore, the first and second radially extending gland walls 46, 48 may be non-linear or angled with respect to a rotary shaft while still extending generally radially outwardly from a central shaft axis 14. By way of further example, a radial surface may include a lip that forms a seal, a cavity or the like. The term "approximately", as used in the claims and the associated portions of the specification in conjunction with measurements or ranges, is defined as meaning "plus or minus ten percent". The language "at least one of 'A', 'B', and 'C'," as used in the claims and/or in corresponding portions of the specification, means "any group having at least one 'A'; or any group having at least one 'B'; or any group having at least one 'C'; —and does require that a group have at least one of each of 'A', 'B', and 'C'." Additionally, the words "a" and "one" are defined as including one or more of the referenced item unless specifically stated otherwise. The terminology includes the words above specifically mentioned, derivatives thereof, and words of similar import.

Referring to FIGS. 1-5 wherein like numerals indicate like elements throughout, there are shown preferred embodiments of seal assemblies 10 which are preferably used to increase the service life of rotary seals. This is preferably accomplished by providing a seal assembly 10 that can compensate for eccentric motion of a rotating or non-rotating shaft with reduced seal deformation and/or improved tracking. This reduction in deformation of the seal and/or better tracking thereby preferably results in longer service life of the seal 38.

Referring to FIG. 1, the seal assembly 10 is configured to dynamically seal a rotary shaft 12 having a central shaft axis 14. The seal assembly 10 improves the tracking between the seal and the rotary shafts 12 so that static and dynamic shaft run out is better tolerated. That is, so that eccentricity between the shaft 12 and a seal gland 16 is better tolerated and has a reduced impact on the seal 38. The gland 16 is shown as having a generally rectilinear exterior 18. However those of ordinary skill in the art will appreciate that the gland 16 may be incorporated into other machine components or have any exterior shape without departing from the scope of the present invention. Additionally, the seal assembly 10 of the present invention also accommodates for static eccentricity (which is when first and second distances 54, 56 vary while the shaft 12 is not rotating). As such, the present invention provides for rotary seals which have improved tolerance of all types of eccentricity, both static and dynamic.

The seal assembly 10 may include a sleeve 20 that is configured for positioning over the rotary shaft 12. The sleeve 20 preferably has a radially inner surface 22 that is configured to contact the rotary shaft 12. The radially inner surface 22 is preferably a generally linear when viewed in axial cross-section. However, those of ordinary skill in the art will appreciate that channels or grooves can be formed therealong without departing from the scope of the present invention.

The sleeve 20 preferably includes a radially outer surface 24. Referring still to FIG. 1, the radially outer surface 24 of the sleeve 20 preferably includes a generally linear section 26 and an inclined section 28. It is preferred, but not necessary, that the generally linear section 26 of the radially outer surface 24 is between approximately forty percent (40%) and approximately seventy percent (70%) of an axial width of the sleeve 20. In the embodiment shown in FIG. 1, the left end of the generally linear section 26 meets the inclined section 28. The inclined section 28 extends generally outwardly away from the rotary shaft 12 while moving generally leftwardly along the radially outer surface 24 of the sleeve 20. It is preferred that the upper end of the inclined section 28 of the sleeve 20 includes a rounded end 30. While specific configuration of the radially outer surface 24 is shown, those of ordinary skill in the art will appreciate from this disclosure that any suitable configuration or contour of the radially outer surface 24 of the sleeve 20 can be used without departing from the scope of the present invention. The sleeve 20 is preferably formed of a high-strength durable material, such as a suitable steel. However, those of ordinary skill in the art will appreciate from this disclosure that any suitable material may be used to form the sleeve 20 without departing from the scope of the present invention.

The radially outer surface 24 preferably includes a primary surface 32. The primary surface 32 is preferably formed by a portion of the inclined section 28 of the radially outer surface 24. The primary surface 32 is preferably oriented at an angle relative to the central shaft axis 14 when the sleeve 20 is positioned over the rotary shaft 12.

The sleeve 20 may include a second material 34 disposed along at least a portion of the radially inner surface 22 of the sleeve 20. The second material is preferably configured to provide a high friction interface between the rotary shaft 12 and the sleeve 20 to encourage the sleeve 20 to rotate with the rotary shaft 12. It is preferred that the second material is a ring formed of high friction material that is adhered or otherwise fixed to the rest of the sleeve 20. The second material 34 is preferably located within a cavity 36 in the sleeve 20. When viewed in cross-section, the cavity 36 preferably has a trapezoidal shape with an upper portion of the cavity 36 being wider than the width of a lower portion of the cavity 36. It is preferred, but not necessary, that the cavity 36 is shaped such that the ring of second material 34 can be press fit therein and held in position by sides 39 of the cavity 36. The second material 34 (whether or not in the form of a ring) can be secured via pressfit, adhesive, sonic welding, heat welding, or the like without departing from the scope of the present invention. Those of ordinary skill in the art will appreciate from this disclosure that the second material 34 can be omitted without departing from the scope of the present invention. Alternatively, a tacky adhesive may be used to encourage the sleeve 20 to rotate with the rotary shaft 12. However, one advantage of using a high friction second material 34 such as a suitably formed O-ring is that it simplifies placement of the sleeve 20 over the rotary shaft 12 as well as replacement or retrofit operations involving the sleeve 20.

A seal 38 has a first seal end 40 and a second seal end 42. It is preferred that when viewed in axial cross-section that the seal 38 has a generally constant width and has a generally rectilinear shape notwithstanding any bend that the seal 38 may go through when installed. The first seal end 40 is preferably configured for securing to the gland 16 which is disposed about the rotary shaft 12 such that, when viewed in axial cross-section, the seal 38 approaches an orientation perpendicular to the central shaft axis 14 proximate to the first seal end 40. Referring still to FIG. 1, a radial axis 44 that is perpendicular to the central shaft axis 14 is shown. The term "approaches an orientation perpendicular", as used in the claims and in the associated portions of the specification, is defined as meaning "moves toward a perpendicular, but does not require actual perpendicularly". For example, the seal 38 is shown as having a first end 40 that is perpendicular to the central shaft axis 14 and parallel to radial axis 44. However, those of ordinary skill in the art will appreciate from this disclosure that depending upon the configuration first and second radially extending gland walls 46, 48 of the gland chamber 50 that a portion of the gland wall to which the first seal end 40 is secured may be askew from perpendicular. Accordingly, those of ordinary skill in the art will appreciate from this disclosure that the seal 38 may approach an angle askew from radial axis 44 by up to approximately thirty degrees (30°) while still being considered to "move toward a perpendicular" and without departing from the scope of the present invention. Although one preferred seal configuration is shown, those of ordinary skill in the art will appreciate from this disclosure that any type of seal may be used without departing from the scope of the present invention. For example, the seal assembly 10 may be used with a U-cup seal or any other suitable type of seal without departing from the present invention.

The second seal end 42 is configured to create a dynamic seal 52 with the primary surface 32 of the sleeve 20 (or rotary shaft 12). As such, it is preferred that the seal 38 contact a dynamic surface which may be formed by the primary surface 32 of the sleeve 20 (or the rotary shaft 12). The advantageous structure of the sleeve 20 of the present invention preferably simplifies retrofitting of the seal assembly 10 onto existing equipment by allowing the sleeve 20 to be positioned over a rotary shaft 12 that was prior used with a seal assembly that forms a dynamic seal along a dynamic surface generally parallel to the central shaft axis 14. Those of ordinary skill in the art will appreciate that the sleeve 20 may possibly be used, shipped, manufactured, or sold by itself for later use with a pre-existing seal assembly without departing from the scope of the present invention. Those of ordinary skill in the art will appreciate from this invention that the seal assembly 10 may incorporate a rotary shaft 12 having a varying diameter therealong such that the angled primary surface 32 is integrally formed with the rotary shaft 12 without departing from the scope of the present invention. Such a rotary shaft could have a radially outer counter similar to that shown by the combination of shaft 12 and sleeve 20 in FIG. 1.

Figure 2:
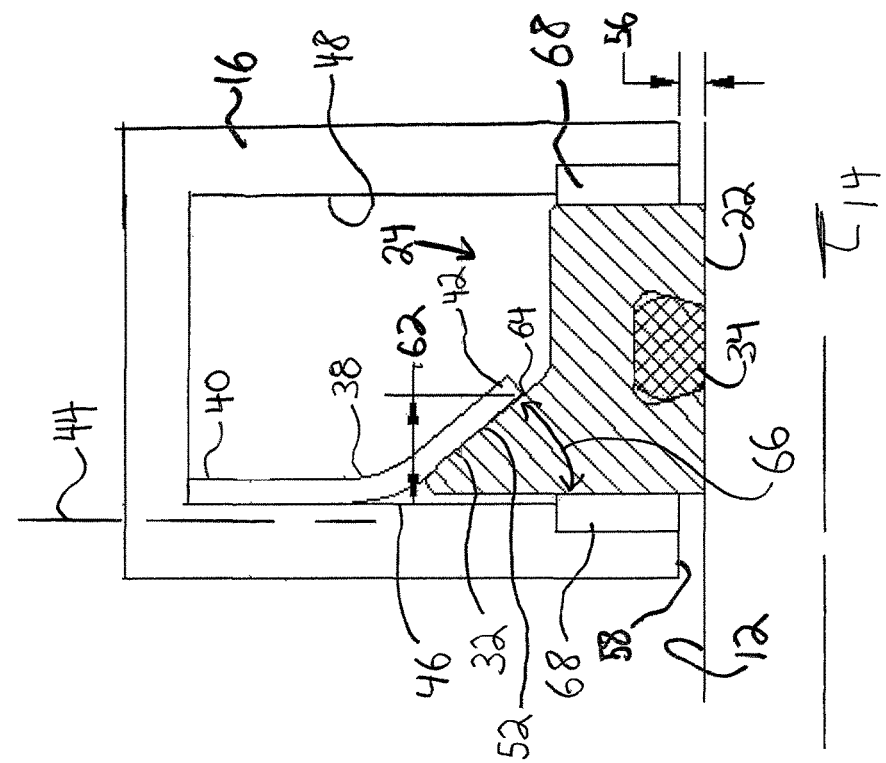
FIG. 2 is another cross-sectional view of the seal assembly 10 of FIG. 1 illustrating a first distance 54 between a lower axially extending surface 58 of the gland 16 and the surface of the rotary shaft 12 and illustrating a first seal deflection distance 60.
Figure 3:
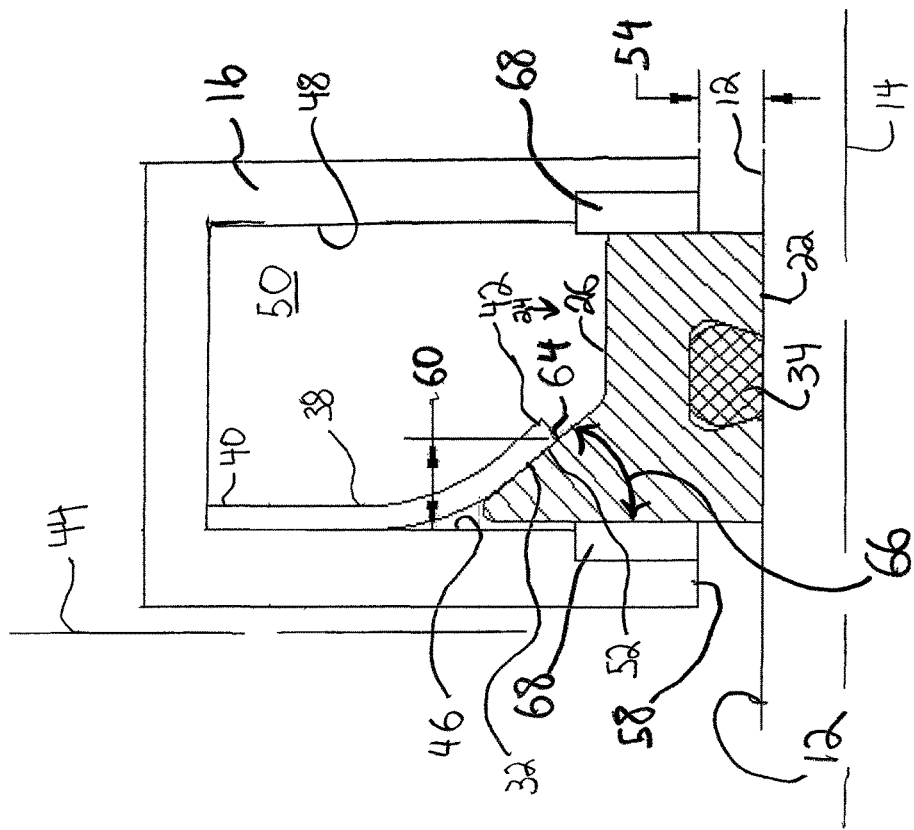
FIG. 3 is another cross-sectional view of the seal assembly 10 of FIG. 1 illustrating a second distance 56 between a lower axially extending surface 58 of the gland 16 and the surface of the rotary shaft 12 and illustrating a second seal deflection distance 62; As discussed below, in some configurations, the primary surface 32 results in a reduction of seal deflection by more than half (more than fifty percent) when experiencing radial eccentricity.

It is preferred that the angle of the primary surface 32 reduce an amount of deflection of the seal 38 resulting from radial eccentricity of the rotary shaft 12. Referring to FIGS. 2 and 3 it can be seen how the angled primary surface 32 reduces seal 38 deflection caused by radial eccentricity of the rotary shaft 12. While it is preferred the rotary shafts do not experience radial eccentricity during use, in practical applications some radial eccentricity is typically present. Radial eccentricity, also referred to as dynamic eccentricity or static eccentricity, can result in shaft run out and can be a significant contributor to seal failure due to the wear caused by persistent deflection of the seal. Referring specifically to FIG. 2, a first distance 54 between a lower axially extending surface 58 of the gland 16 and the surface of the rotary shaft 12 is shown. Referring now to FIG. 3, a second distance 56 between the lower axially extending surface 58 of the gland 16 and the outer surface of the rotary shaft 12 is shown. The difference between the first and second distances 54, 56 is an example of dynamic eccentricity.

Referring again to FIG. 2, a first seal deflection distance 60 is shown. It is preferred that seal deflection distance is measured axially between the first radially extending gland wall 46 and the most distal seal end 64 which contacts the primary surface 32. Referring to FIG. 3, a second seal deflection distance 62 is shown. For a seal assembly 10 having the shown configuration, the following numerical example will demonstrate the dramatic reduction in seal deflection which may occur due to the present invention which may incorporate the sleeve 20, the seal 38, a rotary shaft 12 having an integrated primary surface 32 thereon, and/or the seal assembly 10. Referring again to FIG. 2, the first distance 54 is five point zero eight millimeters (5.08 mm) and the first seal deflection distance 60 is seven point three five millimeters (7.35 mm). Referring to FIG. 3, the second distance 56 is two point zero eight millimeters (2.08 mm) and the second axial deflection distance 66 is eight point eight three millimeters (8.83 mm). Accordingly, under the illustrated conditions, a radial misalignment of the outer surface of the rotary shaft 12 due to dynamic eccentricity in an amount of three point zero millimeters (3.0 mm) only affects the seal 38 by creating one point four eight millimeters (1.48 mm) of deflection. In prior art rotary seals, the amount of seal deflection is typically equal to the amount of radial eccentricity. In this illustrated example, a sealing angle 66 between the primary surface 32 and the radial axis 44 is approximately forty degrees (40°). As shown in FIGS. 2 and 3 and demonstrated in the above numerical calculation, the present invention (in this instance) reduces the amount of seal deflection by more than half. The amount of seal deflection that is reduced for a given radial misalignment can be varied depending upon the angle 66 and other seal assembly and/or component configurations. In addition to the increased seal deflection caused by radial eccentricity, repetitive significant seal deflection may result in improper tracking of the seal 38 along a dynamic surface. As such, the primary surface 32 of the present invention not only preferably reduces seal deflection, and the associated wear on the seal, but preferably improves the proper tracking of the seal 38 along the dynamic surface.

It is preferred that the primary surface 32 is configured such that while the seal 38 forms the dynamic seal 52 that the second seal end 42 is positioned at the sealing angle 66, which is measured between a radial axis 44 that is perpendicular to the central shaft axis 14 and a portion of the seal 38 located proximate to the second seal end 42. While the radial axis 44 is shown as being spaced from the gland 16 in FIG. 1, it is understood that the axial placement of the radial axis 44 is shown for convenience. That is, for purposes of determining the sealing angle 66 a more natural location of the radial axis 44 would be along the first radially extending gland wall 46. It is preferred, but not necessary, that the sealing angle 66 is between approximately twenty degrees (20°) and approximately sixty degrees (60°). It is further preferred that the sealing angle 66 is between approximately thirty degrees (30°) and approximately fifty degrees (50°). It is more preferred that the sealing angle 66 is between approximately thirty-five degrees (35°) and approximately forty-five degrees (45°). It is yet more preferred that the sealing angle 66 is between approximately thirty-seven degrees (37°) and approximately forty-three degrees (43°). It is still more preferred that the sealing angle 66 is between approximately thirty-eight degrees (38°) and approximately forty-two degrees (42°). However, those of ordinary skill in the art will appreciate from this disclosure that any sealing angle 66 may be used without departing from the scope of the present invention.

Referring to FIG. 1, it is preferred that the seal 38 and the sleeve 20 are positioned within the chamber 50 in the gland 16. It is also preferred that the first seal end 40 is secured to the gland 16 and the second seal end 42 is disposed on the primary surface 32 of the sleeve 20. The first seal end 40 is preferably clamped in place in a manner that prevents counter rotation. The first seal end 40 may be clamped in place by a bolt whose radius prevents counter rotation. However, those of ordinary skill in the art will appreciate that any suitable method of securing the first seal end 40 in place may be used without departing from the scope of the present invention.

The chamber 50 is preferably defined by first and second radially extending gland walls 46, 48 between which the sleeve 20 and the seal 38 may be located. A portion of each of the first and second radially extending gland walls 46, 48 preferably forms a bearing pad 68. It is preferred, but not necessary, that the bearing pads 68 extend slightly inwardly from the associated gland wall so that the sleeve 20 is slightly spaced from an adjacent gland wall. One preferred function of the bearing pad 68 may be to reduce wear on the sleeve 20 from the gland 16 as a result of axial motion of the rotary shaft 12. Typically, axial motion of the shaft 12 may occur upon machinery startup and shutdown. Additionally, the bearing pads 68 preferably keep the sleeve 20 properly centered and/or positioned within the gland 16. Another function of the bearing pads 68 may be to reduce heat and frictional contact between the sleeve 20 and the gland 16. For example, it is preferred that the gland be formed of a high-strength durable materials such as steel. If both the gland 16 and the sleeve 20 are formed of steel then the steel on steel contact will result in high heat which may produce increased seal wear and/or deterioration. It is preferred that the bearing pads 68 are formed of a low coefficient of friction material such as a carbon or graphite filled PTFE, Teflon type material, or any other suitable low friction material or the like. The inclusion of carbon or graphite in the PTFE provides increased wear resistance. Similarly any other suitable materials can be mixed into the bearing pads 68 to provide similar increased wear resistance and low frictional contact with the sleeve 20. Accordingly, the preferred low friction material which forms the bearing pads 68 may help reduce unnecessary deterioration of the seal 38 by, in part, reducing heat generation between the sleeve 20 and the gland 16.

Referring to FIG. 4, the sealing assembly 10 may include a spring 70 which overlies at least a portion of the seal 38 to facilitate proper tracking and to increase the load on the dynamic seal 52. The spring 70 is preferably formed of metal, but any suitable material may be used without departing from the scope of the present invention. The spring 70 is preferably clamped in place along with the seal 38 to secure one end thereof in the chamber 50 of the gland 16. The use of the spring 70 increases the range of sealing angles 66 over which the sealing assembly 10 may be used in some applications. Depending upon the necessary force between the seal 38 and the primary surface 32, a particular sealing angle 66 may be further reduced due to the increased force along the dynamic seal 52 created by the spring 70. Referring to FIG. 5, an energizer 72 may be positioned over the seal 38 to increase the force between the second seal end 42 and the primary surface 32 when forming the dynamic seal 52. The energizer 72 is preferably formed of an elastomer material.

One embodiment of the present invention is directed solely to the sleeve 20 by itself. The sleeve 20 is preferably configured for placement over a rotary shaft 12 having a central axis 14 to facilitate the formation of a dynamic and/or static seal around the rotary shaft 12. The sleeve may include a sleeve body 72 configured for positioning over the rotary shaft 12. A radially inner surface 22 of the sleeve body 72 is preferably configured to contact the rotary shaft 12. A radially outer surface 24 of the sleeve body 72 preferably includes a primary surface 32 oriented at an angle relative to the central shaft axis 14 when the sleeve 20 is positioned over the rotary shaft 12. The primary surface 32 is preferably configured to abut a seal 38 to create a dynamic and/or static seal, wherein the angle of the primary surface is configured to reduce an amount of deflection of the seal 38 resulting from radial eccentricity (either static or dynamic) of the rotary shaft.

A preferred implementation of a preferred method of the present invention is described below. The steps of the method of the present invention can be performed in any order, omitted, or combined without departing from the scope of the present invention. As such, optional or required steps described in conjunction with one implementation of the method can also be used with another implementation or omitted altogether. Additionally, unless otherwise stated, similar structure or functions described in conjunction with the below method preferably, but not necessarily, operate in a generally similar manner to that described elsewhere in this application.

One preferred method of providing a dynamic seal around the rotary shaft includes the step of providing a seal 38 having a first seal end 40. The method may also include providing a rotary shaft 12 having a central shaft axis 14. The rotary shaft may have an outer surface comprising a primary surface 32 which is at an angle relative to the central shaft axis 14. The step of providing the rotary shaft 12 may include the rotary shaft having an axial portion with a varying diameter such that the primary surface 32 is integrally formed with the rotary shaft 12.

The first preferred method of the present invention preferably includes securing the first seal end 40 to a location proximate to the rotary shaft 12 such that the second seal end 42 forms the dynamic seal 52 with the primary surface 32. The angle (i.e. the sealing angle of the dynamic seal 52) of the primary surface 32 preferably reduces an amount of deflection of the seal 38 resulting from radial eccentricity (either static or dynamic) of the rotary shaft 12.

The method of the present invention may include the step of providing a sleeve 20 configured for positioning over the rotary shaft 12. The sleeve 20 preferably has a radially inner surface 22 configured to contact the rotary shaft 12 and a radially outer surface 24. The radially outer surface 24 preferably includes the primary surface 32.

The method of the present invention may also include the step of providing a gland 16 Such that the seal 38 and the sleeve 20 are positioned within a chamber 50 in the gland 16. The first seal end 40 is preferably secured to the gland 16 and the second seal end 42 is disposed on the primary surface 32 of the sleeve 20. The chamber is preferably defined by first and second radially extending gland walls 46, 48 between which the sleeve 20 and the seal 38 can be located. A portion of each of the first and second radially extending gland walls 46, 48 preferably forms a bearing pad 68. The bearing pad 68 is preferably formed of a low friction material to reduce wear on the sleeve 20 from the gland 16.

The step of providing the sleeve 20 may further include a portion of the radially inner surface 22 of the sleeve 20 having an increased frictional interface with the rotary shaft 12 to encourage the sleeve 20 to rotate with the rotary shaft 12. It is preferred that the sleeve rotate with the rotary shaft 12 without angular misalignment therebetween. It is further preferred that the sleeve 20 rotate with the rotary shaft 12 without angular misalignment therebetween and with no permanent fixing mechanism securing the sleeve 20 to the rotary shaft 12. That is, it is preferred that the sleeve 20 can be slid over the rotary shaft 12 and then rotate therewith without angular misalignment therebetween without being bolted, clamped, welded, or otherwise fixed thereto.

The method of the present invention may also include the step of increasing the force between the second seal end 42 and the primary surface 32 to improve the dynamic and/or static seal therebetween. As discussed above, the increased force may be provided by a spring 70 or an energizer 72 or any other suitable method or structural component without departing from the scope of the present invention.

Referring to FIG. 1, one embodiment of the present invention preferably operates as follows. A primary surface 32 is provided by either a rotary shaft 12 or sleeve 20 located thereover which is at an angle with a central shaft axis 14 of the rotary shaft 12. A rotary seal 38 is preferably positioned with a second end 42 located on the primary surface 32 to form a seal therewith. The primary surface 32 is preferably at a sealing angle 66 which results in the seal 52 having a higher tolerance for radial eccentricity (either static or dynamic) than otherwise possible.

While various shapes, configurations, and features have been described above and shown in the drawings for the various embodiments of the present invention, those of ordinary skill in the art will appreciate from this disclosure that any combination of the above features can be used without departing from the scope of the present invention. For example, the orientation of the components of the seal can be reversed (when viewed in axial cross section). Alternatively, the configuration of the sleeve 20 and/or seal can be varied without departing from the scope of the present invention. It is understood, therefore, that this invention is not limited to the particular embodiments disclosed, but is intended to cover all modifications which are within the spirit and scope of the invention as defined by the appended claims and/or shown in the attached drawings.

What is claimed is:

1. A method of providing a dynamic seal around a rotary shaft:
   providing a seal having a first seal end and a second seal end, the seal having a generally constant width when viewed in cross section;
   providing the rotary shaft having a central shaft axis,
   providing a sleeve mounted over the rotary shaft, the sleeve having a radially inner surface that contacts the rotary shaft and a radially outer surface, the radially outer surface comprising a primary surface which is at an angle relative to the central shaft axis;
   providing a gland, wherein the seal and the sleeve are positioned within a chamber in the gland, the first seal end being secured to the gland and approaching an orientation perpendicular to the central shaft axis proximate to the first seal end, the second seal end being disposed on the primary surface of the sleeve such that the second seal end forms the dynamic seal with the primary surface, wherein the angle of the primary surface reduces an amount of deflection of the seal resulting from radial eccentricity of the rotary shaft, the chamber being defined by first and second radially extending gland walls between which the sleeve and the seal are located, the primary surface being adjacent to the first radially extending gland wall and the first seal end being secured to the first radially extending gland wall, the seal extends from the first seal end along part of the first radially extending gland wall and along the primary surface while not contacting the second radially extending gland wall.

2. The method of claim 1, wherein the step of providing the sleeve further comprises the sleeve having a varying diameter such that the primary surface is integrally formed with the sleeve.

3. The method of claim 1, wherein the step of providing a sleeve further comprises the outer radial surface having a portion which forms an axially extending radial surface which is generally parallel to the central shaft axis and is located between the primary surface and the second radially extending gland wall.

4. The method of claim 3, wherein the step of providing a gland further comprises a portion of each of the first and second radially extending gland walls forming a bearing pad, the bearing pad being formed of a low friction material to reduce wear on the sleeve from the gland as a result of axial motion of the rotary shaft.

5. The method of claim 1, wherein the step of securing the first seal end further comprises the primary surface being configured such that while the seal forms the dynamic seal the second seal end is positioned at a sealing angle, measured between a radial axis that is perpendicular to the central shaft axis and a portion of the seal proximate to the second seal end, the sealing angle being between approximately thirty-five degrees (35°) and approximately forty-five degrees (45°).

6. The method of claim 3, wherein the step of providing a sleeve further comprises a portion of the radially inner surface having an increased frictional interface with the rotary shaft to encourage the sleeve to rotate with the rotary shaft.

7. The method of claim 1, further comprising increasing a force between the second seal end and the primary surface to improve the dynamic seal.

* * * * *